Nov. 12, 1957 L. E. SODERQUIST 2,812,545
PRESS FOR SHAPING AND VULCANIZING PNEUMATIC TIRES
Filed Oct. 1, 1954 5 Sheets-Sheet 1

INVENTOR.
LESLIE E. SODERQUIST
BY
ATTORNEYS

Nov. 12, 1957  L. E. SODERQUIST  2,812,545
PRESS FOR SHAPING AND VULCANIZING PNEUMATIC TIRES
Filed Oct. 1, 1954  5 Sheets-Sheet 2

INVENTOR.
LESLIE E. SODERQUIST
BY Ely, Frye & Hamilton
ATTORNEYS

Nov. 12, 1957 — L. E. SODERQUIST — 2,812,545
PRESS FOR SHAPING AND VULCANIZING PNEUMATIC TIRES
Filed Oct. 1, 1954 — 5 Sheets-Sheet 3

INVENTOR.
LESLIE E. SODERQUIST
BY
ATTORNEYS

Nov. 12, 1957       L. E. SODERQUIST       2,812,545
PRESS FOR SHAPING AND VULCANIZING PNEUMATIC TIRES
Filed Oct. 1, 1954                     5 Sheets-Sheet 4

INVENTOR.
LESLIE E.
SODERQUIST
BY
ATTORNEYS

Nov. 12, 1957   L. E. SODERQUIST   2,812,545
PRESS FOR SHAPING AND VULCANIZING PNEUMATIC TIRES
Filed Oct. 1, 1954   5 Sheets-Sheet 5

INVENTOR.
LESLIE E. SODERQUIST
BY
ATTORNEYS

United States Patent Office 2,812,545
Patented Nov. 12, 1957

2,812,545

PRESS FOR SHAPING AND VULCANIZING PNEUMATIC TIRES

Leslie E. Soderquist, Silver Lake, Ohio, assignor to The McNeil Machine and Engineering Company, Akron, Ohio, a corporation of Ohio Application October 1, 1954, Serial No. 459,590

9 Claims. (Cl. 18—17)

The present invention is in the nature of a modification upon the mechanism shown and described in applicant's copending application Serial No. 447,476, filed August 3, 1954, for shaping and curing so-called "tubeless tires." With the increased use of tubeless tires, it has been found that tire bands may be shaped and vulcanized under high internal pressure without the interposition of an air bag or flexible diaphragm, and the invention relates to a press especially designed to shape and cure tubeless tires.

In the prior application referred to above, there is shown and described one method of manipulating bead clamping rings so as to insure that the interior of the tire is sealed against loss of internal pressure around the beads and at the same time to mechanically mold the beads to the exactness of contour required, by the use of rigid molding means which engages the inner and outer surfaces of the bead portions of the tire.

The requirements to be met in the above respects are very exacting because the success of the curing operation and the successful performance of the tire require that exact conformity be attained. It is also necessary to devise mechanism to manipulate the bead clamping rings so that the press will operate automatically and dependably; otherwise, loss of product and possible injury to workmen might occur.

The object of the present invention and its principal advantages over the mechanism shown in the prior application is that the mechanism shown herein is readily adaptable to existing forms of presses which are widely used in the shaping and curing of tires by the use of flexible diaphragms which form a part of the press structure.

On the closing of the press the uncured tire band is formed by the approach of the mold sections, which exert a direct compressing action on the beads, and the simultaneous admission of low pressure steam or air to the interior of the tire. When the press is closed the two bead clamping or curing rings, which have been held together and in a position out of contact with the uncured band, separate and force the beaded edges of the tire into the tapered seats which are provided for them in the two mold sections. The bead clamping rings are held firmly against the inner surfaces of the bead portions of the tire during the cure, which serves the dual purpose of forming the beads accurately and also of sealing the beads against the mold so that none of the pressure medium can pass around the beads.

When the cure is completed and the press starts to open, the upper bead clamping ring moves upwardly while the lower ring holds the lowered beaded edge of the tire in contact with the lower mold. This distorts the tire sufficiently to allow any water which has collected in the tire to drain out through the lower ring. Thereafter, the two bead clamping rings move upwardly together, lifting the tire out of the lower mold section in position to be removed from the press.

There are many advantages to the press shown and described herein, the major one being the perfection of a simple and effective mechanism by which a tire band may be shaped and cured without the use of an air bag or diaphragm and with equally satisfactory results.

The drawings and description are detailed to enable one skilled in this art to understand the principles and working of the apparatus, but it will be appreciated that the details are not essential and may be varied or modified within the scope of the advance in the art and the appended claims.

The mechanism which is shown for opening and closing the press is similar to that shown in applicant's prior Patent No. 2,495,664, January 24, 1950. This mechanism is optional as another form of press-operating mechanism may be used. It is essential that the movable mold section, whether it be a top or bottom section, be moved in a direct line in parallelism with the other mold section during the actual shaping operation, which occurs after both mold sections have made contact with the edges of the tire band. In the form of press operating mechanism shown, the upper half is rocked to and from parallel, spaced relation with the lower mold section, but the upper mold section may be moved in a straight line during the entire press operation.

In the drawings:

Fig. 10 is an enlarged detail at the bead area of a tire in the press.

A tubeless tire T, for the curing of which this press is especially designed, is substantially the same as any other tire except for the provision of an impervious lining L on the interior of the tire and around the base of the beads M and sealing ribs R along the exterior of the beads. A tubeless tire usually has a tapered under surface N at each bead to provide a tight fitting area at the rim seat when the tire is mounted on the rim.

The press in which the bead clamping rings and their operating mechanism are shown is of the type in which the lower mold 1 is stationary while the upper mold 2 is movable and rocks at the upper end of its opening movement as shown in Patent No. 2,495,664 so as to allow the operator to place the uncured tire band B in position and to remove the cured tire T.

Figure 4:
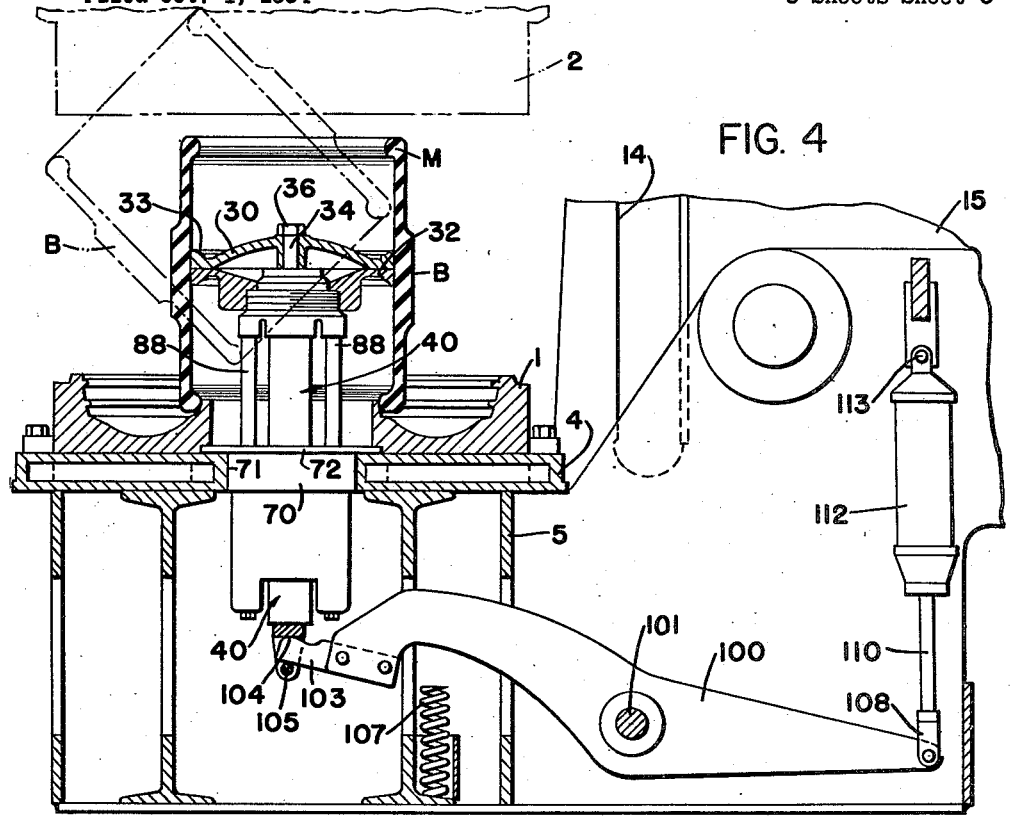
Fig. 4 is a view with the press open and an uncured band in place.

On the closing movement of the press, the upper mold is first rocked into position so that it is parallel to but spaced from the lower mold section as shown in dotted lines in Fig. 4 and is then moved downwardly in a direct line during the shaping of the band and the final closing movement. This allows the upper mold section to contact with the upper beaded edge M of the band B and exert the required pressure on the band, which, with the admission of a low shaping pressure to the interior of the band, will bring it to tire form concurrently with the closing of the press. When the press is closed, the bead shaping rings which have moved downwardly to the dotted line position shown in Fig. 5, separate to force the beads on their seats in the mold sections. This seals the edges of the band and the full shaping and curing pressure is then admitted to the interior of the tire. Before the press opens at the end of the curing cycle, the pressure in the tire is relieved and the press is opened. These operations are all controlled by automatic timing devices (not shown) so that all the operator is required to do is to place the uncured tire band on the lower mold and press a button. At the end of the operation he removes the cured tire.

Only so much of the mechanism for operating the movable mold section shown herein will be described as is necessary for a full understanding of this invention, reference being made to prior Patent No. 2,495,664 for a more complete description.

The lower mold section 1 is mounted on a steam heated platen 4 which is carried on the bed 5 of the press and the upper mold section 2 is fastened to a second steam heated platen 6 which is supported from the upper cross head 8. The opening in the center of the upper mold 2 is closed by a plate 9. The cross head 8 is pivotally connected at 10 to arms 12, the lower ends of which have rollers moving in the vertical slots 14 in the frame 15 of the press.

The cross head is suspended from the lower end of a link 16 which forms one element of a toggle mechanism, the other end of which is formed by the large vertical links 18 pivoted at the lower end of the press as shown in the former patent. A link 20 actuated by a large power driven gear 22 operates the toggle mechanism to open and close the press while the arms 12 guide the upper mold section so that it remains in parallelism with the lower mold during the later part of the press closing movement. This action is characteristic of the tire shaping and vulcanizing presses designed by this applicant and now in extensive use.

Figure 1:
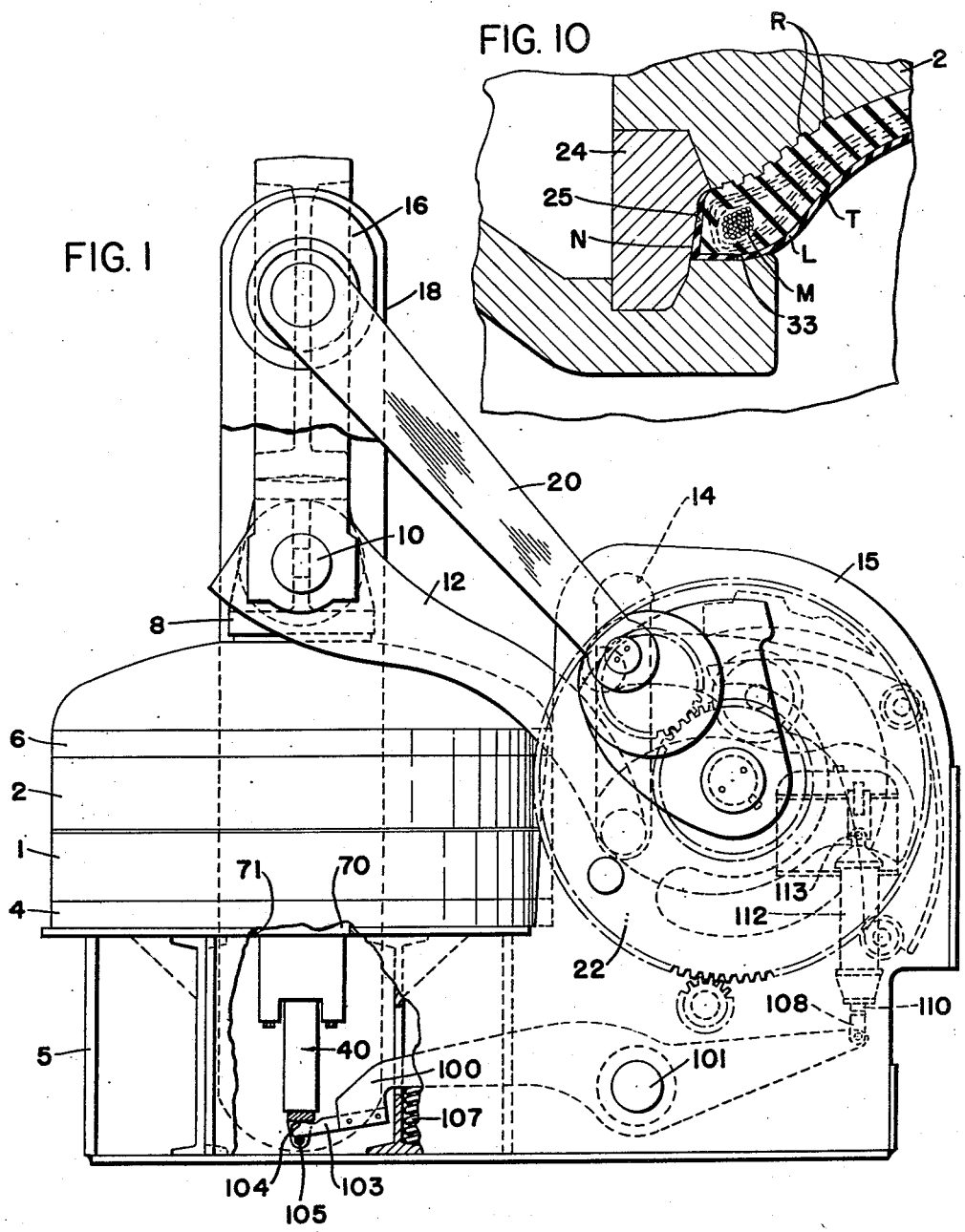
Fig. 1 is an elevation, partly in section, of a press of the type set forth in closed position.
Figures 2, 3:
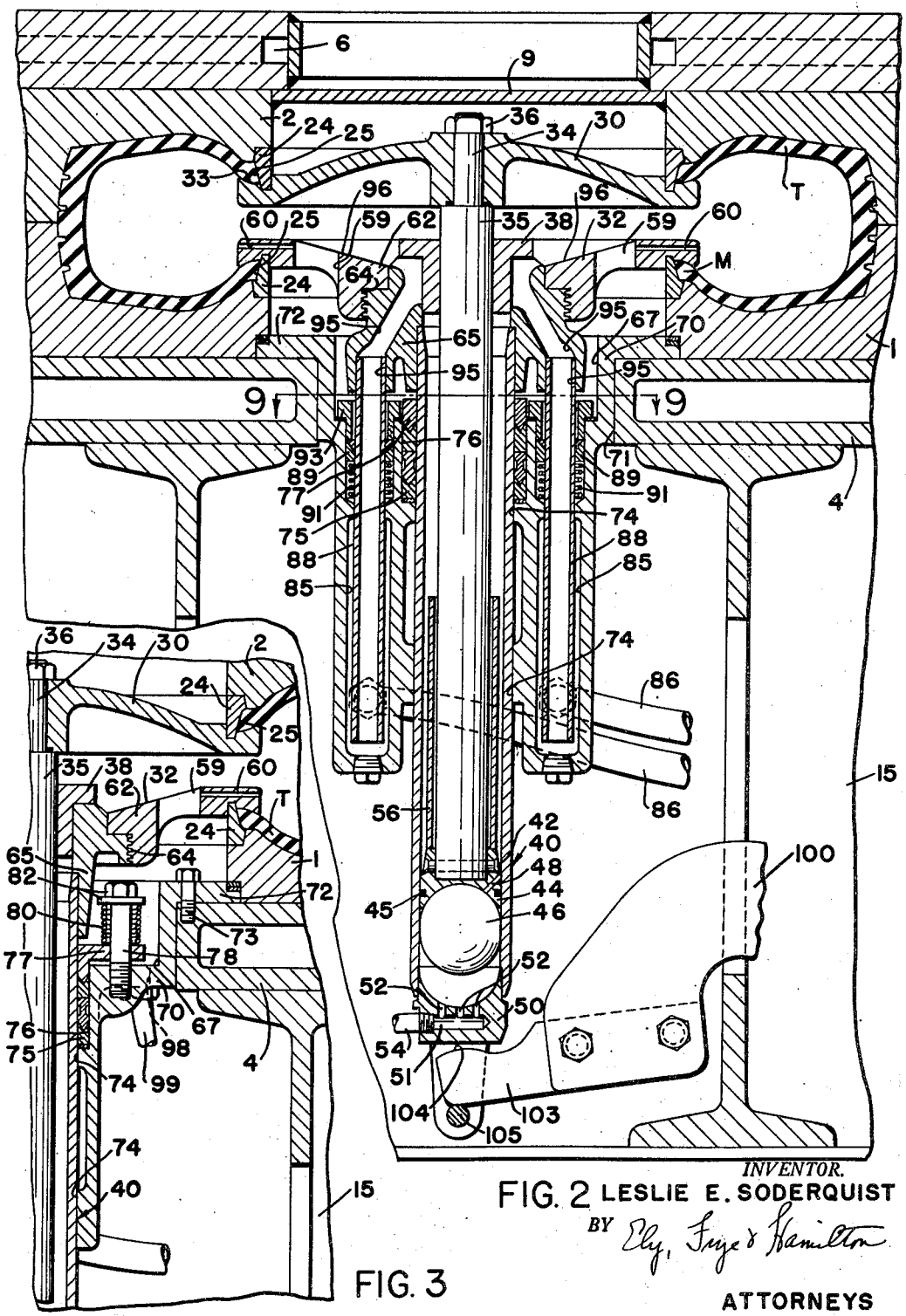
Fig. 2 is an enlarged vertical section through the mold in closed position with the tire in place. This view is taken on the line 2—2 of Fig. 9.
Fig. 3 is a detail section at right angles to the plane of Fig. 2 as shown by the section line 3—3 of Fig. 9.

It will be noted that as shown in the detailed views of Figs. 2, 3 and 10 each mold section is provided with an inserted ring 24, the outer face 25 of which is machined to a taper, usually from 5° to 8°, to form the surface N on the underside of the bead. When the uncured band is placed in the press, as shown in Fig. 4, the lower edge thereof is fitted over the taper on the lower mold 1. When the upper mold section contacts the upper edge of the band, the tapered surface on the upper mold serves to locate the upper edge of the band. The edges of the band are somewhat roughly formed in their uncured state, but when the press is closed and the bead clamping rings move into place, the two beaded edges of the band are forced along the tapers until they fit in the bead seats in the mold sections and as the band is cured the beaded edges are molded to the exact shape required to obtain perfect seals between the underside of the tire beads and the rim, and the beads are sealed against the internal pressure in the tire.

The two bead clamping rings are together in a raised position as shown in Fig. 4 when the press is open, and the operator places the band over the rings, as shown in dotted lines in Fig. 4, and then lowers the band in position on the lower mold. The two rings serve the purpose of holding the band centered so that the upper mold section will enter the upper edge of the band.

The upper bead clamping ring is designated by the numeral 30 and the lower ring by the numeral 32. It will be noted that each ring is carefully machined to fit against the inner edge of its companion mold section and the outer surfaces are machined, as at 33, to fit against the inside surface of the tire at the bead. This insures accurate formation of the beads of the tire.

The ring 30 is centered over the reduced upper end 34 of a vertical shaft 35 and held by a nut 36. The shaft 35 has a sliding fit in a sleeve 38 force-fitted in the center of the lower clamping ring assembly. The shaft extends into a cylinder 40, the upper end of which is also force-fitted into the lower ring assembly. At its lower end, the shaft is pinned as at 42 to an inverted cup-shaped piston 44, which is provided with a piston ring 45 which serves to keep the interior of the cylinder free of deposits. In the hollow on the underside of the piston 44 is a ball 46 which is preferably made of a non-pervious, rubber-like composition, such as a butyl rubber. This ball is somewhat larger in diameter than the interior of the cylinder and is compressed as shown in Fig. 2 so that it has a broad bearing zone in sliding contact with the inner wall of the cylinder 40. Any water of condensation which collects above the piston 44 will find its way through the passage 48 therein and serve to lubricate the ball.

The lower end of the cylinder is closed by a cap 50 which is provided with a passage 51 connected by ports 52 to the interior of the cylinder. A pressure line 54 set in the cap supplies fluid under pressure to the interior of the cylinder 40 to raise the shaft 35 and with it the upper ring 30. A sleeve 56, carried by the piston 44, will contact the underside of the sleeve 38 and arrest the upward movement of the upper ring at the maximum point of separation of the two rings, as shown in Fig. 7.

Figure 7:
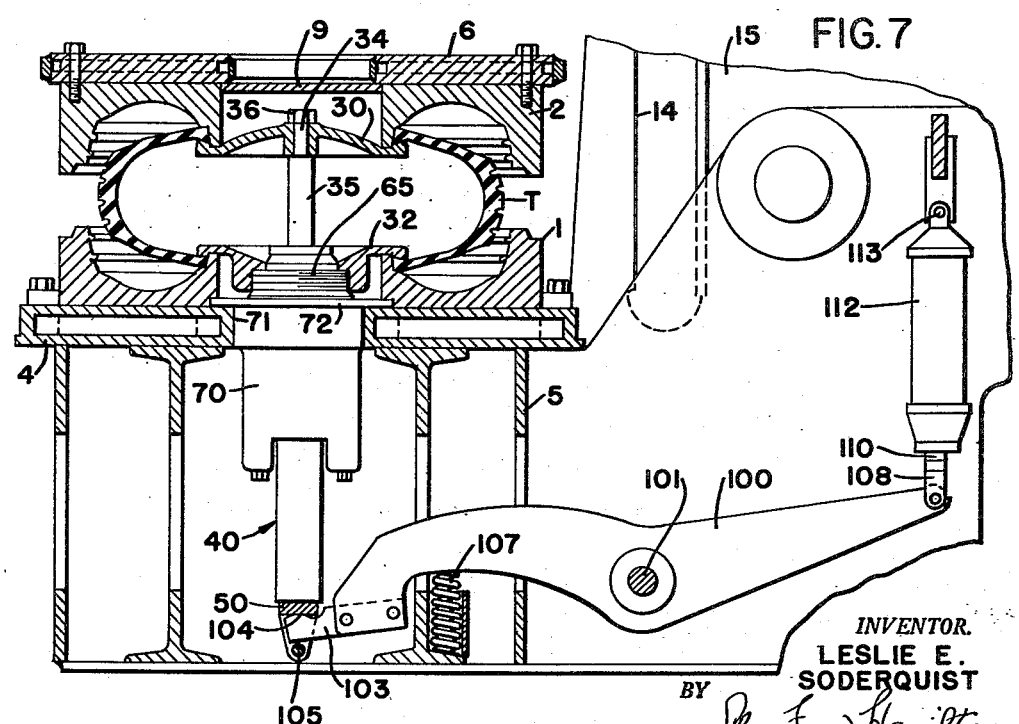
Fig. 7 is a view showing the press as it starts on its opening movement, illustrating the manner in which the tire is distorted at the beginning of the movement to drain water out of the tire.

The lower ring 32 is provided with openings 59 to permit the free passage of steam and water, and around its periphery are a number of drainage ports 60 leading to the opening 59 so that any water trapped in the lower part of the tire after cure may drain out when the tire is held in the position shown in Fig. 7. The inner circumference of ring 32 is formed with a projecting ledge 62 and an internally threaded socket 64. The ring 32 fits over and is threaded upon a relatively deep sleeve 65, in the center of which is fitted the bearing sleeve 38. The cylinder 40 is force-fitted into this sleeve.

The lower end of the sleeve 65 is received in a somewhat larger recess 67 formed in the upper end of a circular casing 70 set in an opening 71 in the center of the lower platen 4. The casing is provided with an outwardly extending rim 72 resting on the top of the platen and held by screws 73.

Figure 9:
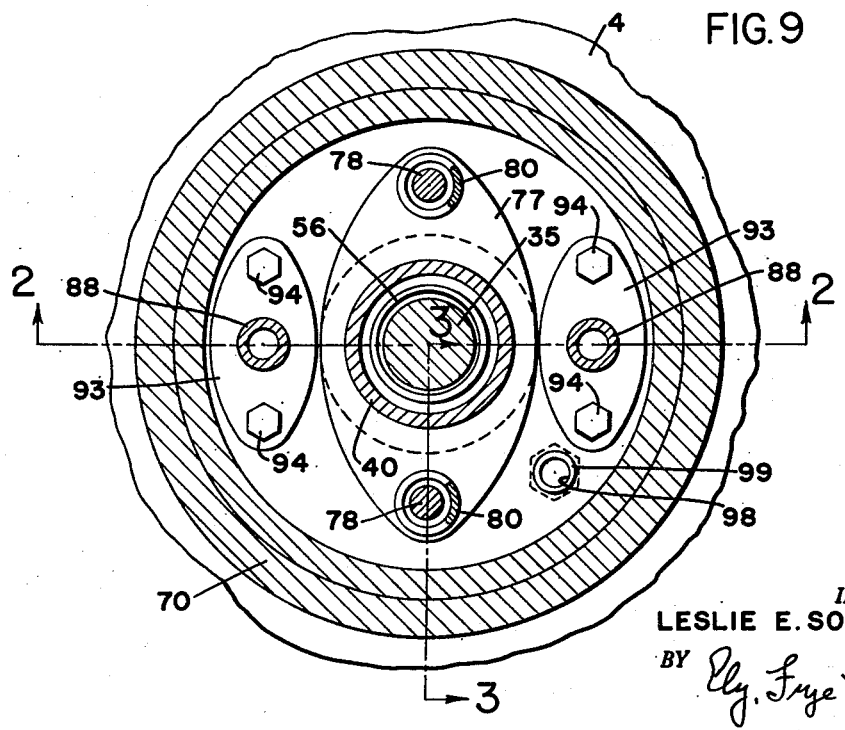
Fig. 9 is a horizontal section on the line 9—9 of Fig. 2.

The casing 70 is in the form shown in the several views and has centrally located bearing surfaces 74 in which the cylinder 40 is reciprocable. A compressible packing gland 75 seated in a recess 76 seals the passage around the upper end of the cylinder being held in place by a pressure disk 77, two wings of which are received over bolts 78 threaded at their lower ends in the casing 70. Coil springs 80 confined by nuts and washers 82 on the upper end of the bolts 78 keep the packing 75 under constant compression (see Figs. 3 and 9).

Formed at diametrically opposite points in the casing 70 are the two depending cylindrical chambers 85 which serve as the inlet and outlet passages for the steam or water which is employed to shape and cure the tire. Conduits 86 are connected to the chambers and supply the steam at the times and under the pressures desired, all of which is controlled by instruments and timers well known in this art.

Movable in each chamber 85 is a pipe 88, the length of which is sufficient to maintain communication with the interior of the chamber during the entire operation of the press. At the points where the pipes 88 pass out of the upper ends of the chambers, compressible packing glands 89 are located. These glands are maintained under the pressure of springs 91, beneath the glands and acting against plates 93 secured by bolts 94 to the lower inside surface of the recess 67 in the casing 70.

The upper ends of the pipes 88 are brazed into the lower ends of vertical passages 95, which open at their upper ends into a conical depression 96 formed in the upper side of the ring 32.

Located at some convenient point in the base of the recess 67 is a drain opening 98 connected to a line 99 through which water collecting in the top of the casing may be drawn off.

Figure 5:
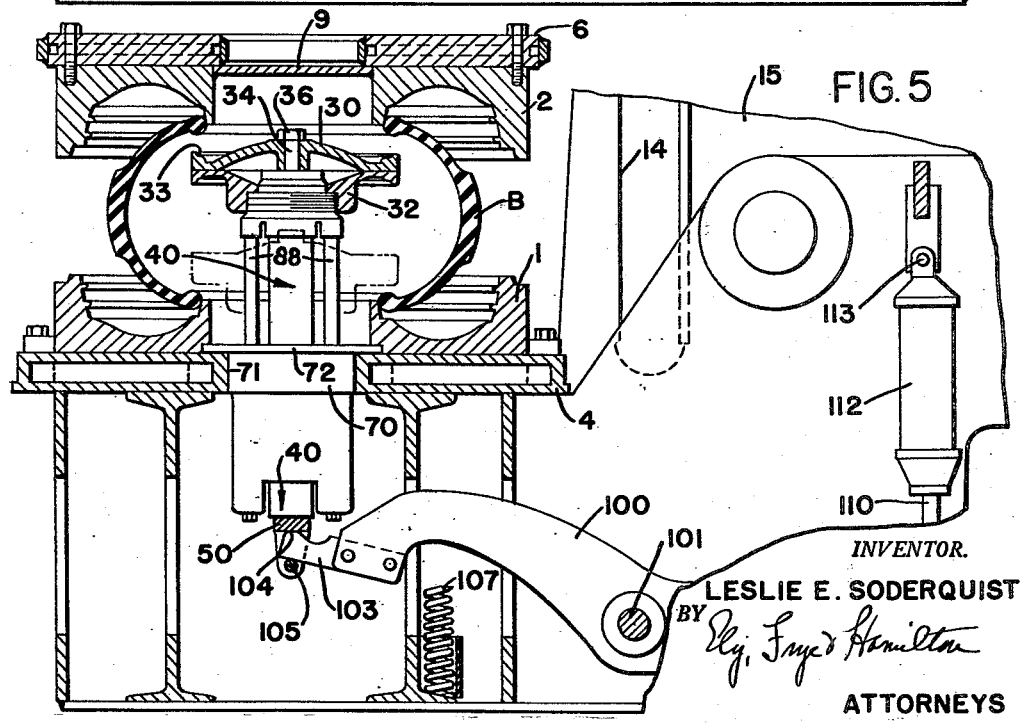
Fig. 5 is a view showing the press at the beginning of the tire shaping movement.
Figure 6:
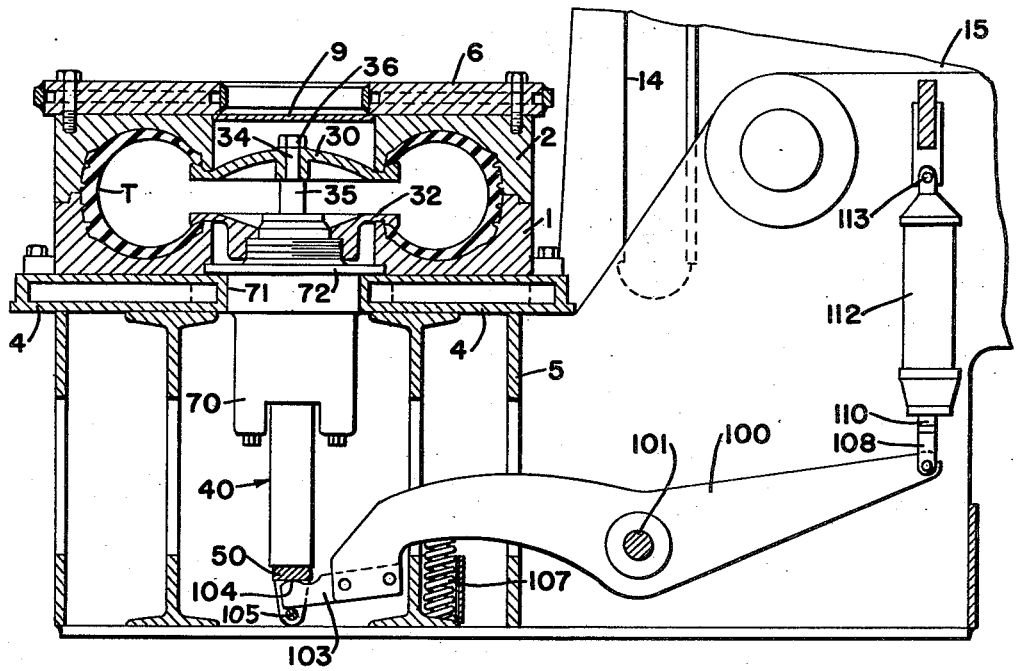
Fig. 6 shows the press closed with the bead clamping rings in engagement with the tire beads.
Figure 8:
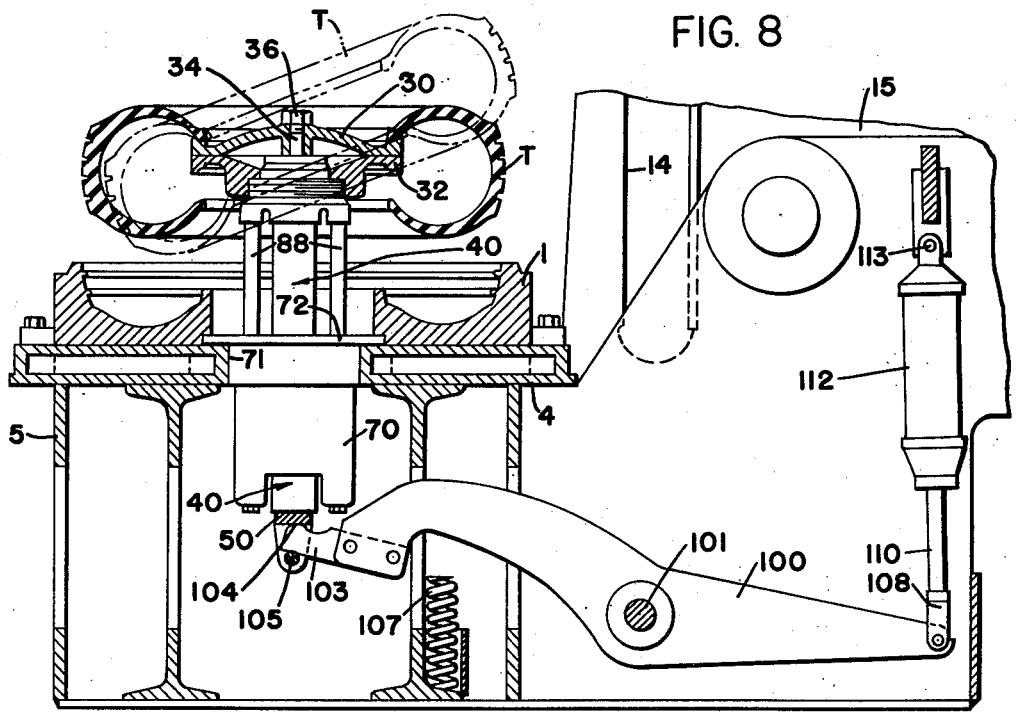
Fig. 8 shows the final opening movement with the cured tire lifted out of the lower mold section.

The entire clamping ring assembly is capable of being raised and lowered between the high position shown in Figs. 4, 5 and 8 to the low position shown in Figs. 2, 6 and 7 by raising and lowering the cylinder 40 in the casing 70. The relative movement of the two rings 30 and 32 is obtained by the reciprocation of the piston 44 in the cylinder 40.

The movement of the clamping ring assembly is through the lever 100 which is mounted at a midway point on a shaft 101 in the base of the press. The outer end of lever 100 is bent downwardly and to the extremity thereof is attached a shoe 103, the end of which is received in a stirrup depending from the lower side of the cap 50. The upper side of the shoe 103 is rounded as at 104 to have a rolling contact with the underside of the cap. A pin 105 across the stirrup limits the relative movement of the shoe and the cap and provides a means whereby the ring assembly may be drawn downwardly. A spring cushion 107 located in the base of the press checks the downward movement of the lever 100.

The other end of the lever 100 is pivotally connected to a clevis 108 carried by the lower end of a piston rod 110, the piston of which is movable in the double acting cylinder 112, the upper end of which is pivoted at 113 to the frame of the press.

When the pressure is admitted to the upper end of the cylinder, both rings 30 and 32 are raised to the position shown in Figs. 4 and 8, which lifts the cured tires out of the mold. The rings are held in this position until after the uncured band is located in the press and as the press closes the pressure in the upper end of the cylinder is gradually released, which permits the ring assembly to lower by its own weight to the dotted line position shown in Fig. 5, where it will remain until the two mold sections come in contact around the tire which has been shaped by the combined action of the molds and the shaping pressure in the interior of the tire.

When the mold is fully closed, the two rings 30 and 32 are forcibly spread apart by the admission of fluid pressure to the interior of the cylinder 40, which raises the upper ring 30 to the position shown in Fig. 2, which forces the upper beaded edge of the band to its seat in the upper mold section.

The reaction will cause some downward movement of the lower ring 32, but in order to force the band more firmly against its seat on the lower mold, pressure is admitted to the lower end of the cylinder 112, which causes the under side of the shoe 103 to ride against the pin 105 and draw the lower ring assembly downwardly.

It will be seeen that by the mechanism described, as soon as the mold closes about the shaped band, the forcible separation of the bead clamping rings will force the edges of the band home and maintain them in that position while the tire is curing.

At the end of the curing period, the automatic timers will release the curing medium and thereafter the press will open. The pressure is maintained in the cylinders 40 and 112 during the first part of the opening movement so that the two beaded edges of the tire will be held against their respective mold sections and the result will be to spread the beads of the cured tire apart, which causes any water trapped in the tire to be drained out through the openings 60. It is desirable to arrest or retard the opening movement of the press at about the position shown in Fig. 7 to allow the water or other residual liquid to drain out and this operation may be assisted by introducing air at a relatively low pressure to the interior of the tire during the draining period.

After the draining period, the press will resume its opening movement and the pressure will be admitted to the upper end of the cylinder 112. At the same time, pressure will be released from the cylinder 40. This will cause the two rings to come together and the entire ring assembly to rise to the position shown in Fig. 8, which strips the cured tire out of the lower mold section and holds it in position to be removed by the operator.

It is believed that the complete operative cycle of the press will have been made clear from the foregoing. The full explanation which has been given will enable the invention to be understood in its best known form, and having so described the invention, its essential features may be retained without adherence to the details which have been given.

What is claimed is:

1. In a press for shaping and curing tire bands while the pressure curing medium is in direct contact with the interior of the band, said press having a pair of opposed mold sections, each section having an angular circumferential bead seat and means to cause the mold sections to approach and recede, a pair of rings lying between the mold sections, the outer circumference of each ring being greater than the inner circumference of the adjacent bead seat and adapted to form with said seat an annular space for molding a tire bead, and means independent of the curing medium to separate the rings after the mold is closed to force the edges of the band into their respective bead seats.

2. In a press for shaping and curing tire bands while the pressure curing medium is in direct contact with the interior of the band, said press having a pair of opposed mold sections, each section having an angular circumferential bead seat and means to cause the mold sections to approach and recede, a pair of rings lying between the mold sections, the outer circumference of each ring being greater than the inner circumference of the adjacent bead seat and adapted to form with said seat an annular space for molding a tire bead, and means independent of the curing medium to separate the rings after the mold is closed to force the edges of the band into their respective bead seats, said last named means being operative to hold the rings against their respective mold sections during recession of the mold sections.

3. In a press for shaping and curing tire bands while the pressure curing medium is in direct contact with the interior of the band, said press having a pair of opposed mold sections, each section having an angular circumferential bead seat and means to cause the mold sections to approach and recede, a pair of rings lying between the mold sections, the outer circumference of each ring being greater than the inner circumference of the adjacent bead seat and adapted to form with said seat an annular space for molding a tire bead, and means independent of the curing medium to separate the rings after the mold is closed to force the edges of the band into their respective bead seats, said last named means being operative to raise the rings jointly after the mold sections have separated to raise the cured tire.

4. In a press for shaping and curing tire bands while the pressure curing medium is in direct contact with the interior of the band, said press having a pair of relatively movable upper and lower mold sections, each mold section having an angular circumferential bead seat, upper and lower rings located between the mold sections, the outer circumference of each ring exceeding the inner circumference of the adjacent bead seat and adapted to form with said seat an annular space to mold a tire bead, a first fluid pressure cylinder connected to the upper ring and a second fluid pressure cylinder connected to the lower ring, said cylinders being operative after the mold sections are in contact to separate the rings and force them against their adjacent mold section.

5. In a press for shaping and curing tire bands while the pressure curing medium is in direct contact with the interior of the band, said press having a pair of relatively movable upper and lower mold sections, each mold section having an angular circumferential bead seat, upper and lower rings located between the mold sections, the outer circumference of each ring exceeding the inner circumference of the adjacent bead seat and adapted to form with said seat an annular space to mold a tire bead, a first fluid pressure cylinder connected to the upper ring and a second fluid pressure cylinder connected to the lower ring, said cylinders being operative after the mold sections are in contact to separate the rings and force them against their adjacent mold section, said cylinders being operative during the first part of the mold opening movement to hold the rings in contact with their respective mold sections and thereby to spread the tire for drainage.

6. In a press for shaping and curing tire bands while the pressure curing medium is in direct contact with the interior of the band, said press having a pair of relatively movable upper and lower mold sections, each mold section having an angular circumferential bead seat, upper and lower rings located between the mold sections, the outer circumference of each ring exceeding the inner circumference of the adjacent bead seat and adapted to form with said seat an annular space to mold a tire bead, a first fluid pressure cylinder connected to the upper ring and a second fluid pressure cylinder connected to the lower ring, said cylinders being operative after the mold sections are in contact to separate the rings and force them against their adjacent mold section, said second cylinder being operative during the latter part of the mold opening movement to raise the cured tire.

7. In a press for shaping and curing tire bands while the pressure curing medium is in direct contact with the interior of the band, said press having a pair of relatively movable upper and lower mold sections, each mold section having an angular circumferential bead seat, upper and lower rings located between the mold sections, the outer circumference of each ring exceeding the inner circumference of the adjacent bead seat and adapted to form with said seat an annular space to mold a tire bead, a first fluid pressure cylinder connected to the upper ring and a second fluid pressure cylinder connected to the lower ring, said cylinders being operative after the mold sections are in contact to separate the rings and force them against their adjacent mold section, said second cylinder being operative during the latter part of the mold opening movement to raise the first cylinder to elevate the cured tire above the lower mold section.

8. A press in accordance with claim 2 having means to drain residual fluid from the interior of the cured tire.

9. In a press for shaping and curing tires while a pressure curing medium is in direct contact with the interior of the tire, said press having a pair of relatively movable upper and lower mold sections, each mold section having a circumferential bead seat which is angular in cross section, upper and lower rings located between the mold sections, the outer circumference of each ring exceeding the inner circumference of the adjacent bead seat and adapted to form with said bead seat an annular space to mold a tire bead, a fluid operated cylinder connected to each ring and said cylinders being operative during the first part of the mold opening movement to hold the rings in contact with their respective mold sections, and a drain to provide escape for residual fluid from the cured tire.

References Cited in the file of this patent

UNITED STATES PATENTS

| | | |
|---|---|---|
| 1,942,797 | Bittaker | Jan. 9, 1934 |
| 2,243,532 | Maynard | May 27, 1941 |
| 2,337,857 | Soderquist | Dec. 28, 1943 |
| 2,495,664 | Soderquist | Jan. 24, 1950 |
| 2,571,258 | Kolins | Oct. 16, 1950 |
| 2,699,572 | Soderquist | Jan. 18, 1955 |